US005603087A

United States Patent [19]
Shultz

[11] Patent Number: 5,603,087
[45] Date of Patent: Feb. 11, 1997

[54] INTERFERENCE DETECTION TECHNIQUE

[75] Inventor: Edward C. Shultz, Buffalo Grove, Ill.

[73] Assignee: Motorola, Inc., Schaumburg, Ill.

[21] Appl. No.: 302,003

[22] Filed: Sep. 6, 1994

Related U.S. Application Data

[63] Continuation of Ser. No. 693,186, Apr. 29, 1991, abandoned.

[51] Int. Cl.$^6$ .................................................. H04B 17/00
[52] U.S. Cl. .................. 455/52.3; 455/63; 455/226.3; 455/226.4; 455/296
[58] Field of Search .................................. 455/33.1, 33.2, 455/33.3, 33.4, 226.1, 226.2, 226.3, 226.4, 54.1, 56.1, 63, 65, 62, 52.3, 52.1, 10, 67.3, 67.6, 67.7, 324, 214, 336, 295, 296, 110; 375/44, 51, 58, 99, 57; 379/58, 59, 63

[56] References Cited

U.S. PATENT DOCUMENTS

| | | | |
|---|---|---|---|
| 4,268,722 | 5/1981 | Little et al. | 379/59 |
| 4,412,350 | 10/1983 | Miedema | 455/52.3 |
| 4,485,486 | 11/1984 | Webb et al. | 455/56.1 |
| 4,549,311 | 10/1985 | McLaughlin | 455/52.3 |
| 4,561,114 | 12/1985 | Kozono . | |
| 4,654,867 | 3/1987 | Labedz et al. | 455/33.2 |
| 4,696,027 | 9/1987 | Bonta | 455/33.2 |
| 4,777,659 | 10/1988 | Lindenmeier et al. | 455/226.4 |
| 4,882,768 | 11/1989 | Obana et al. | 455/207 |
| 4,998,289 | 3/1991 | Rabe et al. | 455/33.1 |
| 5,128,965 | 7/1992 | Henriksson | 375/58 |

OTHER PUBLICATIONS

Modern Digital and Analog Communications Systems B. P. Lathi, 1983, pp. 64–66.
All Digital Rayleigh Fading Simulator, Richard Comroe, Proceeding of the National Electronic Conference, vol. 32 Chicago, IL, USA C16–18 Oct. 1978.

*Primary Examiner*—Andrew Faile
*Attorney, Agent, or Firm*—Richard A. Sonnentag

[57] ABSTRACT

Briefly described, the present invention is a circuit for detecting and indicating a level of interference on a high frequency angular modulated signal. This circuit includes a logarithmic amplifier for receiving high frequency angular modulated signals and for providing a logarithmic amplifier output in response thereto. Next, the angular modulated signals are detected to determine a level of associated FM modulation thereof. Finally, a processor, programmed to distinguish those high frequency spectrum components due to interference from those due to other sources, determines a carrier to interference ratio. Of note, when the level of FM modulation at the logarithmic amplifier input exceeds a predetermined threshold, however, the associated carrier to interference ratio is ignored.

18 Claims, 5 Drawing Sheets

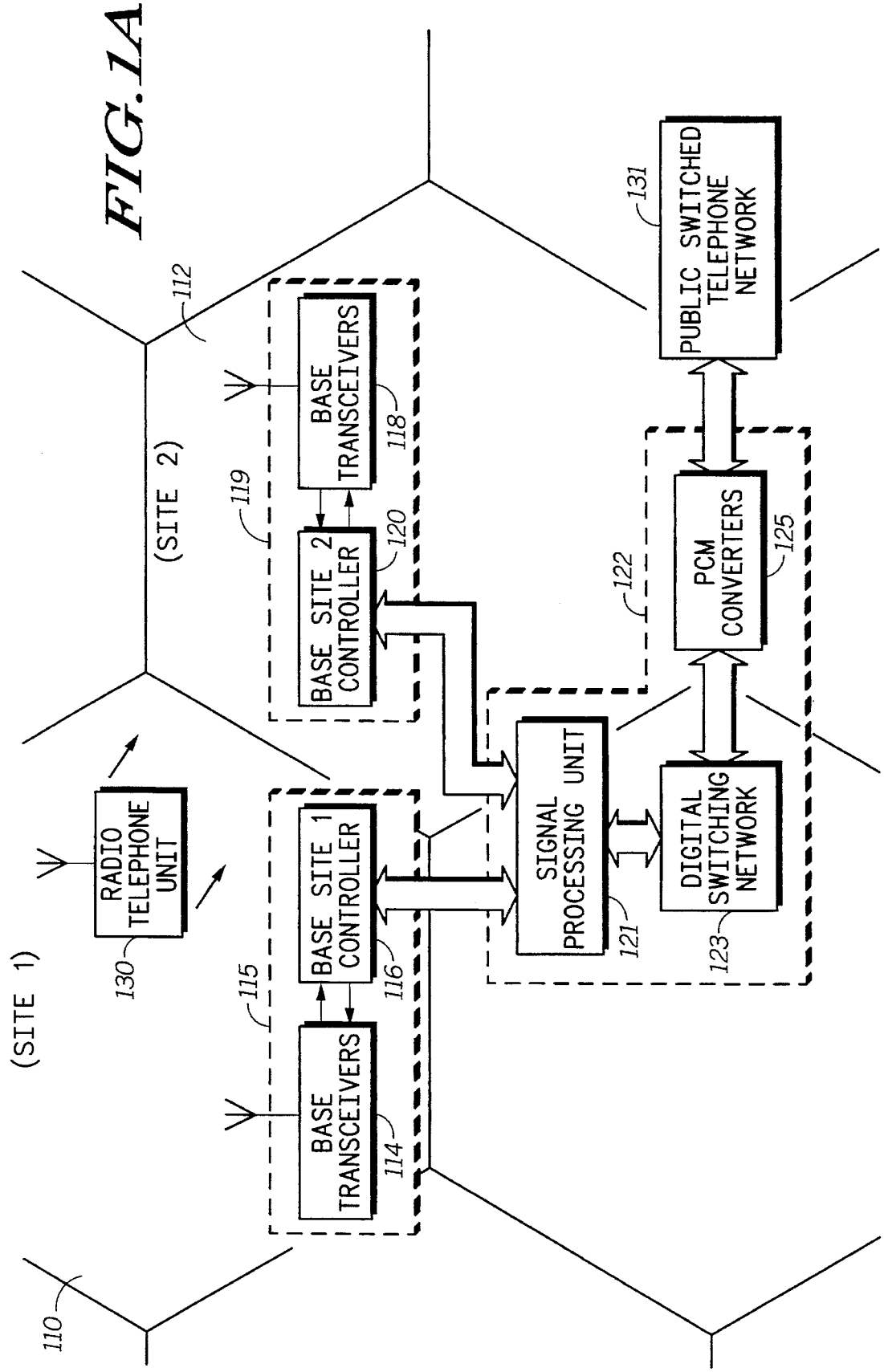

INTERFERENCE DETECTION TECHNIQUE

This is a continuation of application Ser. No. 07/693,186, filed on Apr. 29, 1991 now abandoned.

FIELD OF THE INVENTION

The present invention relates to cellular radiotelephone communication systems, and more particularly, to interference detection in such systems.

BACKGROUND OF THE INVENTION

In cellular-type radiotelephone communication systems using angle modulation, i.e., frequency modulation (FM) or phase modulation (PM), communication is often impaired as a result of radio interference, such as, for example, co-channel and/or multipath interference. Co-channel interference is caused by spurious transmissions within the communication channel of concern. Multipath interference typically results when a signal is deflected off many structures, creating multiple reception paths, and is received as a number of multiple signals, each offset in time. Both types of interference can seriously inhibit the quality of communication.

Before this type of interference becomes unacceptable, a cellular communication system should, if possible, switch (hand-off) the communication channel to another cell to prevent disrupting the call. This requires, however, that the interference be accurately detected, and that the system knows the extent to which the co-channel and multipath interference are contributing factors. Consequently, the prior art reflects numerous methods for detecting radio interference and the extent to which it contributes to communication signal degradation.

One such system is described in U.S. Pat. No. 4,561,114, Kozono et al. and "Co-Channel Interference Measurement Method for Mobile-Communication," IEEE Transactions on Vehicular Technology, Vol VT-36, No 1, February 1987, both incorporated herein by reference. In these publications, it is proposed that co-channel interference can be detected in a narrow band communication system by looking for a high frequency beat signal (AM modulation) produced by an interfering co-channel signal. The interference is detected based on the frequency content of the envelope of the received signal to distinguish between shadow fading (discussed later in more detail) and co-channel interference. This is accomplished through a digital analysis technique which samples a first set of signals on a relatively infrequent basis, and samples an overlapping second set of signals on a relatively frequent basis. The extraction of a substantial number of samples from the first set of signals allows the system to average out interference due to fading, while the extraction of the second set of signals allows the system to obtain the average level of the high frequency beat signal. According to Kozono, the average level of the high frequency beat signal (AM modulation) indicates the amount of interference caused by co-channel interference.

Unfortunately, the system described above suffers from the disadvantage that it is liable to make false interference detections, i.e., false on fading. It will be appreciated by those skilled in the art that co-channel and multipath are not the only sources of high frequency spectrum components in the envelope of a received signal. On the contrary, in a mobile radiotelephone environment, characterized by the high speed of radiotelephone units, high frequency spectrum components due to fading in the Khz range must be anticipated. Yet another source of these high frequency spectrum components is due to the amplitude response of filters used in a receiver for intermediate frequency (IF) selectivity.

Since the Kozono detector detects an average level of the high frequency components in the envelope of a received signal, it is apt to respond to conditions other than interference. It would be extremely advantageous therefore to provide an interference detector and technique capable of overcoming the shortcomings of the prior art.

SUMMARY OF THE INVENTION

Briefly described, the present invention is a circuit for detecting and indicating a level of interference on a high frequency angular modulated signal experiencing fading. This circuit comprises: a logarithmic amplifier for receiving high frequency angular modulated signals and for providing a logarithmic amplifier output in response thereto; sampling means for sampling the logarithmic amplifier output for a period less than the inverse of the period associated with angular modulated signal's fading frequency; and indicating means, in communication with said sampling means, for indicating a level of interference on the high frequency angular modulated signal.

According to an alternative embodiment, the interference detector further comprises an FM detector, coupled to the logarithmic amplifier input, for receiving the angular modulated signals, detecting an associated FM modulation thereof, and providing an output;

It is a first advantage of the present invention that the indicating means isolates those high frequency components due to interference from those high frequency components due to other sources.

It is a second advantage of the present invention that the indicating means determines an angular modulated signal to interference ratio based upon the high frequency components due to interference.

It is a further advantage of the alternate embodiment of the present invention that the developed ratio is ignored when the detected FM modulation exceeds a predetermined threshold.

BRIEF DESCRIPTION OF THE DRAWINGS

FIG. 1a is a diagram of a cellular communication system including two base sites and their respective equipment;

DETAILED DESCRIPTION OF THE PREFERRED EMBODIMENT

Figure 1B:
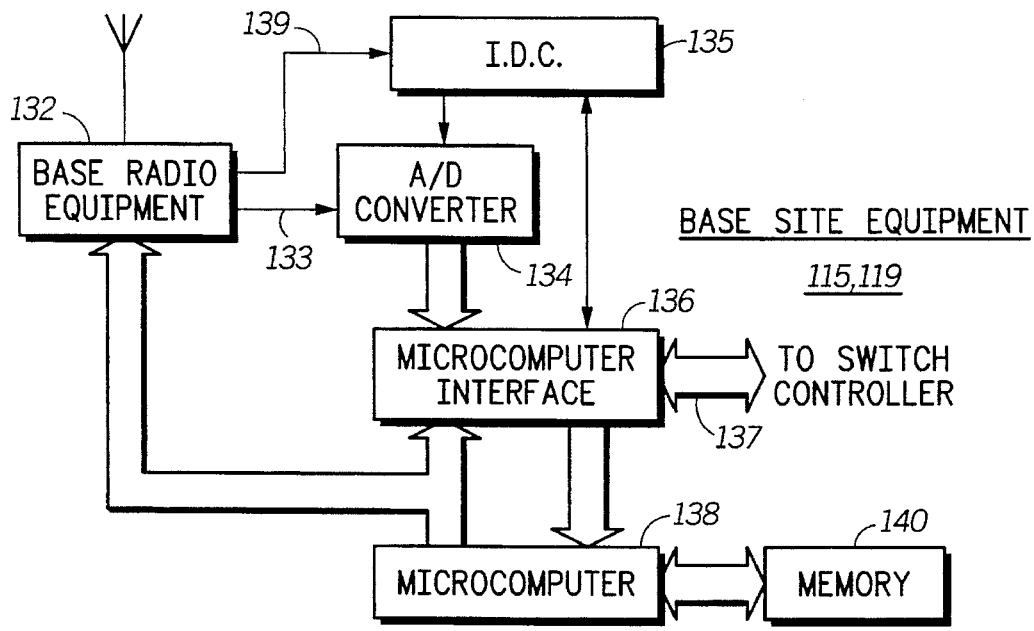
FIG. 1b is an expanded diagram of a portion of the radio equipment 115 and 119, or 130 of FIG. 1a that includes an interference detector circuit 135.

The arrangement disclosed in this specification has particular use for detecting interference on a radio frequency (RF) communication channel in a cellular radiotelephone communication system. More particularly, the arrangement disclosed herein is directed to employing the detection of such interference in order to determine when corrective measures are required, such as, for example, handing-off radiotelephone calls between cells in a cellular radiotelephone communication system.

FIGS. 1a, 1b, 1c and 1d respectively illustrate a cellular system, base site equipment used in the system and interference detection circuitry used in the base site equipment, according to the present invention. The interference detection circuitry provides a basis on which the need for avoiding disruptive interference is determined.

The system in FIG. 1a includes base site equipment 115 and 119 for two geographic radio frequency (RF) coverage areas (cells) 110 and 112, respectively. For cell 110, the base site equipment 115 includes a set of base transceivers 114 and a base site (1) controller 116. For cell 112, the base site equipment 119 includes a set of base transceivers 118 and a base site (2) controller 120 with substantially identical circuitry as the base site equipment 115.

For purposes of exemplifying a handoff operation according to the present invention, a radiotelephone unit 130 is depicted in transition from cell 110 to cell 112.

Overall control of the base site equipment 115 and 119 is provided by a signal processing unit 121 of a cellular switch controller 122. The switch controller 122 also includes a digital switching network 123 for controlling the call switching operation between a public switched telephone network (PSTN) 131 and the base site equipment 115 and 119. A set of pulse code modulation (PCM) converters 125 are included in the cellular switch controller 122 for interfacing the system to the PSTN 131. For general details of a conventional cellular system, reference may be made to "Cellular Voice and Data Radiotelephone System", Labedz et al., U. S. Pat. No. 4,654,867. For further details of a conventional cellular switch controller, reference may be made to U. S. Pat. No. 4,268,722, Little et al. Both of the above U.S. patents are assigned to the same assignee and incorporated herein by reference.

In FIG. 1b, a receiver portion of the base site equipment 115 or 119 is shown in expanded form. It should be noted that these blocks can also represent the receiver portion of the radio telephone unit 130. Within the radiotelephone unit 130, this circuitry may be used for reporting signal quality to the system for use in handoff control. Alternatively, the radiotelephone unit 130 can determine a level of signal quality degradation and request that the system initiate a handoff.

FIG. 1b includes conventional base radio equipment 132 for communicating with radiotelephones within its associated coverage area. The voice paths between the switch controller 122 (FIG. 1a) and the base radio equipment 115 or 119 are depicted as 137.

The intelligence control of the base site equipment is provided by a microcomputer 138 and its associated memory unit 140. The microcomputer 138 is used to control the radio equipment 132 and to couple the base site equipment with the signal processing equipment 121 of the switch controller 122 (FIG. 1a). An analog to digital converter (ADC) circuit 134 is used for receiving output signals via a signal path 133, from a receiver (not shown) within the base radio equipment 132. The output signals of the receiver contain signals received from the radiotelephones, and, after being converted by the ADC circuit 134, such signals are analyzed by the microcomputer 138 to obtain signal information (including radiotelephone identification-related and signal quality information such as RSSI and SAT signals) from radiotelephone units in active calls. A microcomputer interface circuit 136 is used to interface the ADC circuit 134 and the switch controller 122 with the microcomputer 138. For further details of base site equipment, reference may be made to U. S. Pat. Nos. 4,549,311-McLaughlin, 4,485,486-Webb et al. and 4,696,027-Bonta, the latter of which are also assigned to the same assignee and incorporated herein by reference.

Additionally, an interference detection circuit (IDC) 135 is employed in conjunction with the A/D converter 134 to provide the microcomputer 138 with supplemental signal information regarding the signal quality of radiotelephones in active calls. The signal quality information is developed from an intermediate frequency (IF) signal provided at a signal path 139 by the base radio equipment 132, and is used to inform the microcomputer 138 as to the level of co-channel and/or multipath interference on the channel being received by the base radio equipment.

The information being received via the A/D converter 134 is synchronized with the information being received by the IDC 135 so that the microcomputer 138 can determine which radio call is being contaminated with the interference. It should be noted that for each receiver circuit receiving data on a communication channel, a corresponding IDC 135 is provided therewith to simultaneously indicate the level of interference on the communication channel. When a threshold level of such interference is detected contaminating an active call, the switch controller is informed so that a determination to avoid the interference can be made. When required, the base site equipment hosting the active call will instruct the radiotelephone unit 130 to take appropriate action (discussed in more detail with FIG. 3).

Figure 1C:
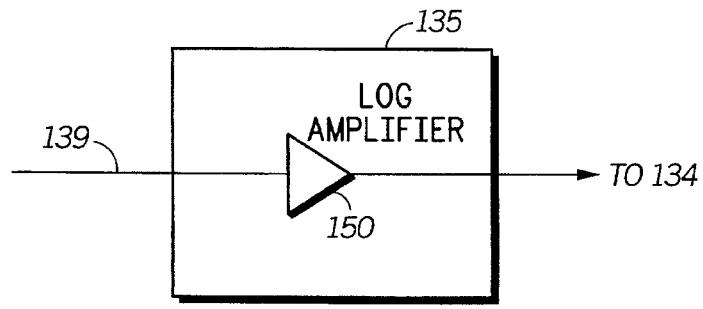
FIG. 1c is an expanded diagram of a first embodiment of the interference detector 135.
Figure 1D:
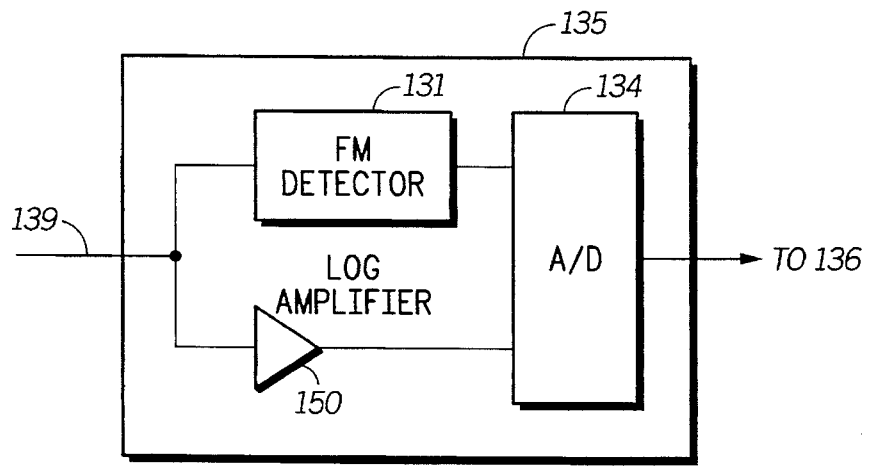
FIG. 1d is an expanded diagram of an alternate embodiment of the interference detector 135.
Figure 1E:
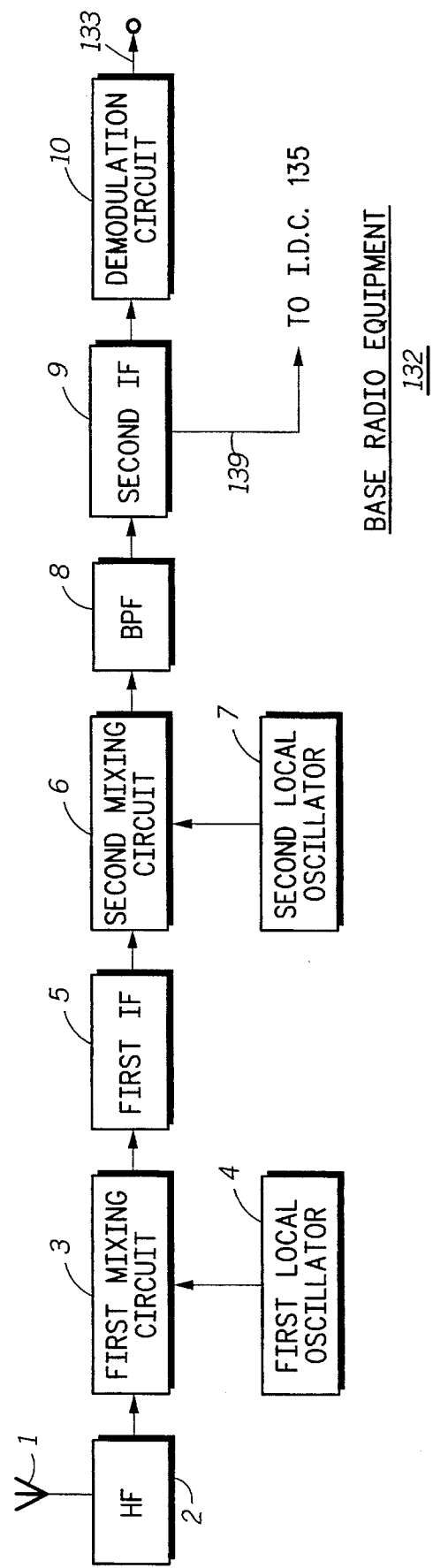
FIG. 1e is a circuit block diagram showing the base radio equipment 132 of FIG. 1b in expanded form.

FIG. 1e is a circuit block diagram showing the base radio equipment 132 of FIG. 1b in expanded form and as is known in the art. The base radio equipment includes an antenna 151 connected to a high frequency (HF) amplifier circuit 152. The HF amplifier circuit 152 is connected a first mixing circuit 153 which mixes the received FM signal amplified by by the HF amplifier circuit 152 with a local oscillation signal generated by a first local oscillator circuit 154. The first mixing circuit 153 outputs an intermediate frequency (IF) signal. The intermediate frequency signal is fed to a first intermediate frequency (IF) amplifier 155. The first IF amplifier 155 is designed to amplify the first IF signal output from the mixing circuit 153.

The output of the first IF amplifier 155 is fed to a second mixing circuit 156 which mixes the output of the first IF amplifier with a local oscillation signal from a second local oscillator circuit 157. The second local oscillation circuit 157 is designed to produce a local oscillation signal in the intermediate frequency band which is equivalent to the intermediate frequency of a general broadcast radio frequency band The intermediate signal output from the second mixing circuit 156 is fed to a second IF amplifier 159 via a band pass filter 158. The output of the second IF amplifier 159 is fed to a demodulator circuit 160 which FM demodulates the intermediate signal output from the second IF amplifier 159, prior tO delivery to the A/D converter 134 of FIG. 1b. In accordance with the preferred embodiment the output of the second IF amplifier 159 is also fed to IDC 135 of FIG. 1b.

The IDC 135 in FIG. 1b is arranged to take advantage of the following facts. First, it is well known that radio interference, such as co-channel and/or multipath, causes amplitude modulation on a received (IF) signal. Secondly, this interference amplitude modulates the received (IF) signal at a higher frequency than is typically produced by other types of fading such as shadow fading or Rayleigh fading. For a thorough discussion of such fading, reference may be made to *"Microwave Mobile Communications"*, W. C. Jakes, Wiley & Sons, 1974. Thirdly, the P—P AC Swing developed at the output of a logarithmic amplifier coincides with the amount of interference on the received (IF) signal. For additional discussion on these points, reference may be made to U.S. Pat. No. 4,998,289-Rabe et al. assigned to the present assignee and incorporated herein by reference.

The mathematical discussion below shows that, for high data rate communications, multipath interference causes an envelope fluctuation of an angle modulated signal that is in the same frequency range as that caused by co-channel interference.

It is supposed that the desired signal is represented as $$e_1(t)=S(t) \sin (w_1 t + \Delta w_1/P_1 \sin P_1 t) \quad (1)$$

with amplitude $S(t)$ at carrier frequency $w_1$. This signal is frequency modulated at a modulating frequency of P1 with peak frequency deviation of $\Delta w_1$.

Similarly, let $$e_2(t)=I(t) \sin (w_2 t + \phi + \Delta w_2/P_2 \sin (P_2 t + \theta)) \quad (2)$$

represent an interfering signal with amplitude $I(t)$, carrier frequency $W_2$, modulating frequency $P_2$ and peak frequency deviation $\Delta W_2$. The factors $\phi$ and $\theta$ are arbitrary phase offsets, in the carrier and modulating waveforms, respectively, between the desired signal and interfering signal.

With the foregoing as background, consider the instance when the interfering signal is produced by multipath propagation with time delay $T_d$. In this case, certain parameters of the interfering signal are related to the desired signal, i.e., $$w_1=w_2 \quad (3)$$

$$\Delta w_1=\Delta w_2 \quad (4)$$

$$P_1=P_2 \quad (5)$$

$$\theta = P_2 T_d = P_1 T_d \quad (6)$$

The factors $I(t)$ and $\phi$ are still independent, because they are affected by properties of the reflecting surfaces producing the multipath signal. They are, therefore, unpredictable.

Substituting equations 3-6 into equation 2, results in $$e_2(t)=I(t) \sin (w_1 t + \phi + \Delta w_1/P_1 \sin (P_1 (t-T_D))).$$

Summing $e_1(t)$ and $e_2(t)$ represents the resultant signal seen by the receiver. This composite signal is a combination of the desired signal plus a delayed "echo" due to multipath interference which has both amplitude and frequency fluctuations. However, the primary concern is the unique amplitude (envelope) fluctuation caused by the multipath interference.

Letting the squared envelope of the composite signal (power envelope) be represented by:

$$R^2(t)=|e_1(t)+e_2(t)|^2 \quad (8)$$

and making the substitutions given in equations 3-6, results in $$R^2(t)=S^2(t)+I^2(t)+2S(t) I(t) \cos Y(t) \quad (9)$$

where $$Y(t) = \phi + \Delta w_1/P_1 (\sin P_1(t-T_D) - \sin P_1 t = \quad (10)$$

$$\phi + 2 \Delta w_1/P_1 [\cos(P_1 t - P_1 T_D/2) \sin(-P_1 T_D/2)]$$

Two of the components of $R^2(t)$, namely $S^2(t)$ and $I^2(t)$, represent the slowly varying amplitude of the desired and interfering signals, respectively. The third component, $[2 S(t) I(t) \cdot \cos Y(t)]$ represents the higher frequency envelope fluctuations due to the combination of the desired signal plus multipath interference. Because it is known that the frequency of fluctuations caused by this third component is approximately $d/dt\ Y(t)$, from equation 10, it can be recognized that $$d/dt\ Y(t)=2\Delta w_1[\sin (P_1 t - P_1 T_D/2) \sin(-P1 T_D/2)] \quad (11)$$

Thus, the peak frequency of envelope fluctuations due to multipath is equal to twice the peak frequency deviation of the original modulation.

In a high speed data system employing FSK modulation, this peak frequency deviation will be typically in the range of several kilohertz to several megahertz. On the other hand, the envelope fluctuations due to time variations of $S(t)$ and $I(t)$ will typically occur at rates from zero Hertz to a few dozen Hertz, where the upper frequency limit is set by the Doppler frequency associated with the motion of the receiver (or reflector) through the electromagnetic field produced by the carrier wave of the signal at frequency $w_1$.

Furthermore, it can be shown that there is a direct relationship between the percentage of amplitude modulation on the envelope of the received signal and the ratio of interference to desired signal.

Assuming, for the moment that $$|2\Delta w_1/P_1 \sin (P_1 T_D/2)| > \pi \quad (12)$$

then the $[\cos Y(t)]$ term in equation 9 can be replaced by its extreme values $(\pm 1)$, giving $$\text{Max}\ (R(t))=S(t)+I(t) \quad (13)$$

$$\text{Min}\ (R(t))=S(t)-I(t).$$

Defining the AM modulation index as half of the difference between the maximum and minimum values of $R(t)$, divided by the average value of $R(t)$, we get the interference to signal ratio directly:

$$\begin{aligned} AM &= [1/2(Max(R(t)) - Min(R(t)))]/ \\ &\quad [1/2(Max(R(t)) + Min(R(t)))] \\ &= I(t)/S(t). \end{aligned} \quad (14)$$

Referring once again to equation 12, the consequences of this assumption will be explained. First, in order for equation 12 to strictly apply $$\Delta w_1/P_1 \geq \pi/2, \quad (15)$$

i.e., the FM modulation index must be greater than 1.4.

Secondly, the sine term must be near its maximum, i e, $$P_1 TD = n\pi/2, \text{ for n odd} \quad (16)$$

This is equivalent to saying that the multipath delay should be an odd multiple of half the period of the modulating waveform. In a digital communication system this is equivalent to saying that the delay is at least one (odd) number of bit (or symbol) periods. This is the same condition that leads to maximum intersymbol interference in a digital communication system.

Accordingly, in a relatively high data rate communication system, the instantaneous frequency offset of an angle modulated signal resulting from either co-channel or multipath interference produces a higher frequency variation in the detected envelope than is typically produced by fading.

The IDC 135 of FIG. 1c, which is an expanded diagram of the IDC 135 of FIG. 1b, is arranged to take advantage of the fact that a logarithmic envelope detector can rapidly provide a direct indication of the amount of interference on the received (IF) signal without the need for averaging the more slowly varying mean signal strength. More specifically, the logarithmic amplifier 150 will provide an AC output signal having a magnitude that is directly related to the percentage of amplitude modulation in the envelope of the received (IF) signal 139 regardless of the absolute magnitude of the received (IF) signal 139. The amplitude modulated IF signal 139 received by the logarithmic amplifier 150 is expressed mathematically as:

$$S(t) = S_o(1 + A_m \sin w_m t) \sin w_c t \qquad (17)$$

where:

$S_o$ is the average signal strength;

$A_m$ is the modulation level (% AM=100×$A_m$);

$w_m$ is the modulating frequency; and $w_c$ is the carrier frequency (IF).

The envelope function of S(t) may be obtained by removing the $w_c t$ term from equation (17), resulting in:

$$R(t) = \text{Env}\,[s(t)] = S_o(1 + A_m \sin w_m t). \qquad (18)$$

Taking the logarithm of both sides of equation (18) yields:

$$\text{Log}\, R(t) = \text{Log}\, S_o + \text{Log}\,(1 + A_m \sin w_m t). \qquad (19)$$

The DC component of the envelope function (or the average signal strength) can be recognized from equation (19) as the term Log $S_0$, while the term Log $(1+A_m \sin w_m t)$ can be recognized as the AC component of the envelope function having maxima and minima of Log $(1+A_m)$ and Log $(1-A_m)$, respectively. The relationship between the % AM, $A_m$, minima, maxima, Peak to Peak (P—P) AC Swing and P—P AC of equation (19) is summarized in the table below which includes computational data based on the foregoing equations, and assuming that $S_o = 1$ (if $S_o$ is larger the P—P AC Swing table entries would not be effected due to the subtraction of the minima and maxima terms).

| % AM | $A_m$ | Log R(t) |Min | Log R(t) Max| | P—P AC Swing | (P—P AC)/$A_m$ |
|---|---|---|---|---|---|
| 2 | .02 | −.009 | .009 | .018 | .90 |
| 5 | .05 | −.022 | .021 | .043 | .86 |
| 10 | .1 | −.046 | .041 | .087 | .87 |
| 20 | .2 | −.097 | .079 | .176 | .88 |
| 50 | .5 | −.301 | .176 | .477 | .95 |
| 70 | .7 | −.523 | .203 | .753 | 1.08 |
| 80 | .8 | −.699 | .255 | .954 | 1 19 |
| 90 | .9 | −1.000 | .279 | 1.279 | 1.42 |
| 100 | 1.0 | −infinity | .301 | infinity | infinity |

The first two columns of the table indicate the actual percentage of amplitude modulation imposed onto the received (IF) signal and the corresponding fraction thereof (%/100), respectively. The third and fourth columns indicate the previously discussed minima and maxima terms from equation 19, respectively. The fifth column, representing the P—P AC Swing, is the maxima table entry for the corresponding amount of AM less the corresponding minima table entry. The last column indicates the relationship of correspondence between the P—P AC Swing measurement and the amount of AM, i.e., [P—P AC Swing measurement/ amount of AM].

The last column in the above table indicates that for $A_m$ between 0 to 0.8, the P—P AC Swing coincides directly with $A_m$ to within ±20% accuracy. In critical situations, the accuracy of the measured value of Am could be improved by using a look-up table to relate the measured P—P AC Swing to $A_m$. In summary, this illustrates that the output of the logarithmic amplifier 150 can provide a direct indication of the amount of amplitude modulation on the received (IF) signal 139.

The IDC 135 is also arranged to take advantage of a discovery made pursuant to the present invention: radio interference is not the only source of the high frequency AM modulations typically associated with the presence of interference. While it is generally accepted that the instantaneous frequency offset of an angle modulated signal resulting from either co-channel or multipath interference produces a higher frequency variation in the detected envelope than is normally produced by fading, it will be appreciated that the use of a logarithmic amplifier 150 will generate harmonics of any fading induced low frequency AM components. Consequently, high frequency AM modulation due to fading in the Khz range must be anticipated.

In this effort, the logarithmic amplifier 150 of FIG. 1c, in conjunction with the A/D converter 134 of FIG. 1b are arranged to detect interference of the received angular modulated signals under the influence of fading. As will be appreciated, under fading conditions, the fading frequency) is dependent upon the velocity of the mobile receiver and the wavelength of the electromagnetic wave (carrier). When a mobile moves at 40 kilometers/hour and the carrier frequency is 900 Mega hertz, resultant low frequency components in the 30 hertz range are anticipated. When amplified by the logarithmic amplifier 150, however, harmonic components in the Kilohertz range must be anticipated.

In order to accurately distinguish those amplitude modulations caused by interference, the present invention employs A/D converter 134 to sample the logarithmic amplifier 150 output for a period of time less than the period associated with the fading frequency, thereby effectively avoiding any AM components that are due to fading.

Yet another source of these high frequency AM components is due to the amplitude response of filters used in the receiver for intermediate frequency (IF) selectivity. When a received carrier is fixed in amplitude and frequency modulated (FM), an amplitude variation will be detected after an IF filter due to the amplitude variations in the IF filter's passband. As the instantaneous frequency of the carrier varies due to FM modulation, the received amplitude of the IF filter will vary. This phenomenon, resulting from FM to AM conversion generates a fundamental frequency of the AM modulation at twice the frequency of the FM modulation. The amplitude of these AM modulations is proportional to the amplitude of the FM modulation of the received (IF) signal 139.

In order to maintain an acceptable audio quality or signalling performance, the ratio of desired signal power (carrier) to interfering signal power (interferer) must be maintained above a threshold level determined by system performance criteria. An interference detector could measure the amplitude of the AM content of a received signal 139 to infer a carrier to interference (C/I) ratio, however such a system would be prone to falsely indicate as interference, that high frequency AM modulation due to other sources. Accordingly, the AM modulation due to a logarithmic amplifier's harmonic response and/or the AM modulation due to FM to AM conversions must be distinguished from that due to interference in order to assure the generation of an accurate C/I ratio.

In accordance with these facts and discoveries, in FIG. 1d, the IDC 135 from FIGS. 1b and 1c is shown in expanded form to include logarithmic (Log) amplifier 150, the previously discussed A/D converter circuit 134 and an FM detector 151. A logarithmic amplifier is conventionally included as part of cellular radio equipment, as is the A/D circuit 134 and the microcomputer circuit 138 including its interface 136 and memory unit 140. The circuit arrangement of FIG. 1d employs the logarithmic (Log) amplifier 150 to develop an output signal representing the Log envelope of the received (IF) signal 139. The output from logarithmic amplifier 150 is a voltage which has a DC component proportional to the mean signal strength at the input and an AC component proportional to the mean ratio of the desired signal power (C) to the interfering signal power (I). The FM detector 151 also receives the IF signal 139 to detect an amplitude of the FM modulation thereof. This measurement is used to determine if the AM modulation at the input to the logarithmic amplifier 150 is due to interference or to the FM to AM conversion phenomenon.

The outputs from both the logarithmic amplifier 150 and the FM detector 151 are sampled by the A/D converter circuit 134 which provides samples to the microcomputer 138 via interface unit 136. While FIG. 1d employs a single A/D converter circuit, it will be appreciated that separate A/D converter circuits for both the logarithmic amplifier 150 and the FM detector 151 represents an obvious modification to the IDC 135 illustrated in FIG. 1d.

A program stored in the memory unit 140 of FIG. 1b enables the microcomputer 138 to distinguish amplitude variations due to fading and fading harmonics from those due to interference. Based upon this determination the microcomputer accurately determines a ratio of C/I. At the same time, the amplitude of the FM modulation of the received (IF) signal 139 is measured. If the amplitude of the FM modulation exceeds a predetermined threshold it is assumed that the AM component at the logarithmic amplifier output is based upon the FM to AM conversion phenomenon rather than upon interference. Under the control of the microcomputer 138, no C/I measurement is made.

The logarithmic amplifier 150 can be employed using a conventional integrated circuit such as those used for RSSI (received signal strength indicator) measurements in cellular radios. For example, an integrated circuit such as an MC3363 available from Motorola, Inc. is adequate. Generally, such circuits are described in "Applications IC Handbook". Plessey Semiconductors', PSI 1828, pp 31–39, incorporated herein by reference.

The FM detector 151 is preferably an FM discriminator circuit. It will be appreciated by those skilled in the art, however, that a simple peak detector JAS is known in the art, may be substituted therefore.

Figure 2:
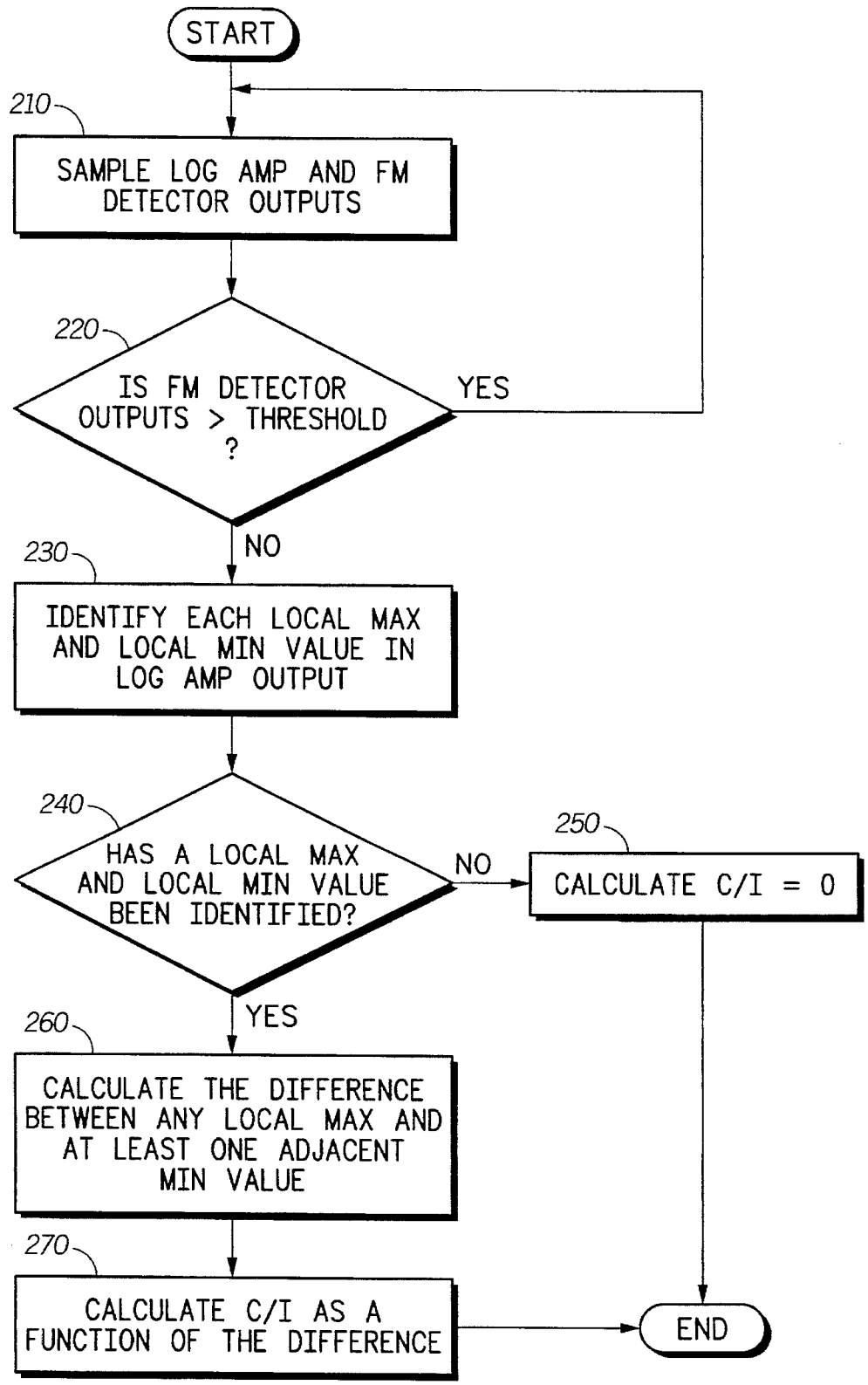
FIG. 2 is a flowchart, which may be implemented by the microcomputer of FIG. 1b, to calculate a C/I ratio according to the present invention.

In FIG. 2, a flowchart illustrates a manner in which the IDC 135 of FIG. 1d can be used by the microcomputer 138 of FIG. 1b to determine a C/I ratio according to the present invention. The flowchart begins at block 210 where A/D converter circuit 134 is employed to sample both the logarithmic amplifier 150 and FM detector 151 outputs. Sampling proceeds for a period determined to be less than the input signal's fading frequency. From block 210, flow proceeds to block 220 where a test is performed to determine if the FM detector 151 output is greater than a predetermined threshold. If so, no C/I measurement is calculated and flow returns to block 210. As previously discussed, when the amount of FM modulation detected by FM detector 151 exceeds a predetermined threshold, concurrent C/I measurements may provide false information, accordingly none will be taken.

If the threshold has not been exceeded, however, flow proceeds to block 230 where the microcomputer 138 analyzes the logarithmic amplifier 150 output (an AC voltage) to identify local maximum (Max) and local minimum (Min) values. By definition, a local Max value is a point on the graph of the logarithmic amplifier output that has an amplitude greater than all other nearby points on the graph. Conversely, a local Min value is a point on the graph of the logarithmic amplifier output that has an amplitude less than all other nearby points on the graph. More precisely, if the logarithmic amplifier output is $f$, the value $f(c)$ is a local maximum value of the function $f$ if $f(x) \leqq f(c)$, for all x sufficiently near c. Similarly, the value $f(c)$ is a local minimum value of $f$ if $f(x) \geqq f(c)$ for all x sufficiently near c.

From block 230, flow proceeds to block 240 where a test is performed to determine if at least one local Max and Min value was identified at block 230. It is again worth noting that the sampling period for block 210 is a period less than the period associated with the input signal's fading frequency. Consequently, if a local Max and Min value is not identified during the sampling period, the present invention attributes the AM modulation at the logarithmic amplifier output to a source other than interference. Flow will therefore branch to block 250 where the microcomputer will calculate C/I=0 and end the run.

Else flow will proceed to block 260 where the microcomputer 138 will calculate the amplitude difference between a local Max and at least one adjacent local Min value identified at block 230. Thereafter, at block 270, the microcomputer will calculate a value for C/I as a function of the amplitude differences and end the run. For example, C/I may be calculated as the largest amplitude difference between any identified local Max and Min values. Alternatively, C/I may be calculated as the average of several amplitude differences calculations.

It will be appreciated by those skilled in the art that by removing block 220 from FIG. 2, FIG.2 can be modified to illustrate a manner in which the IDC 135 of FIG. 1c can be used by the microcomputer 138 of FIG. 1b to determine a C/I ratio.

Figure 3:
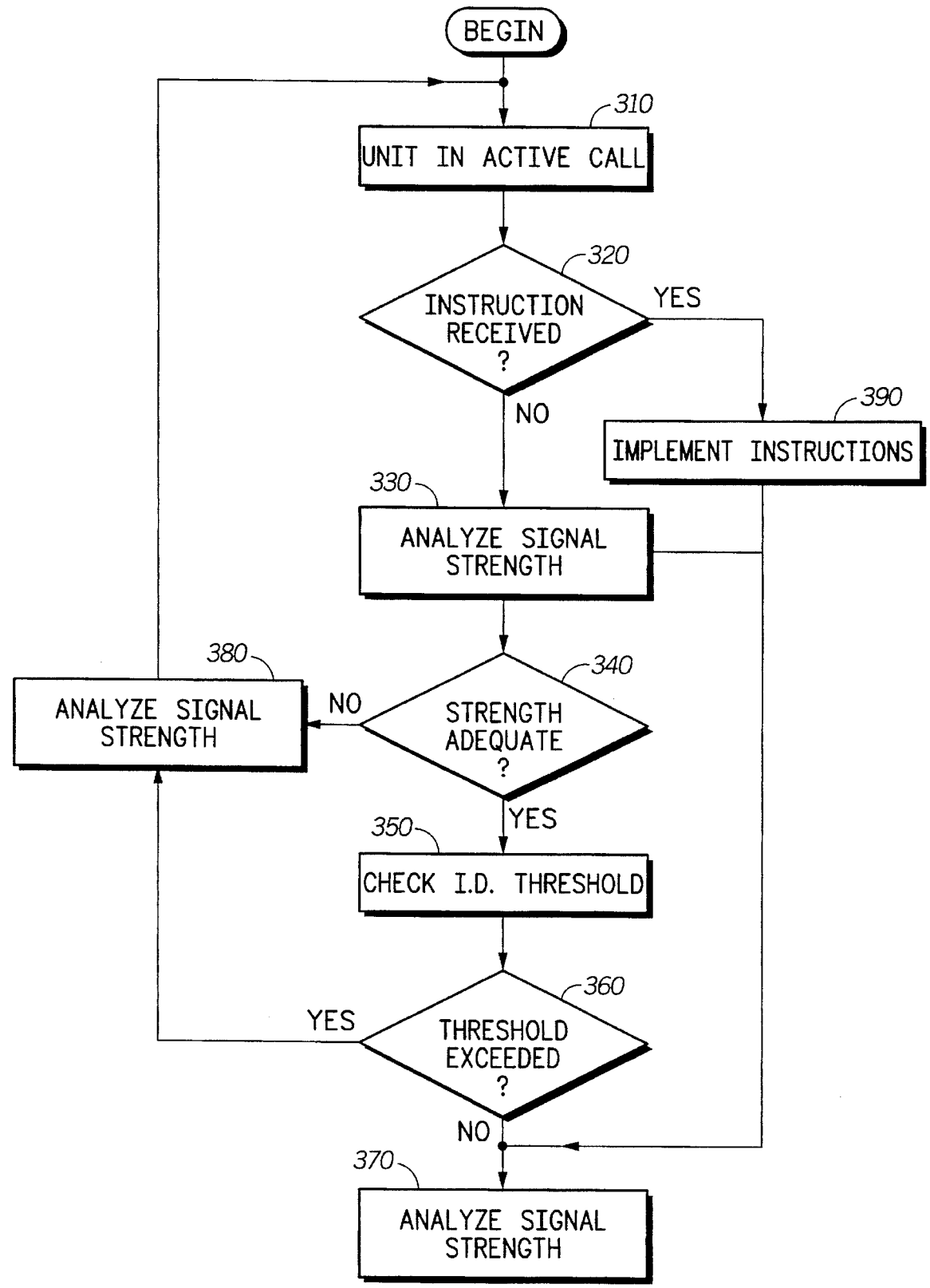
FIG. 3 is a flowchart, which may be implemented by the microcomputer of FIG. 1b, to avoid interference in a communication system using the interference detector circuit 135.

In FIG. 3, a flow chart illustrates a manner in which the IDC 135 of FIGS 1b, 1c and 1d can be used by the microcomputer 138 of FIG. 1b to avoid interference. The flow chart begins at block 310 where a radiotelephone unit is depicted in an active call. From block 310, flow proceeds to block 320 where a test is performed to determine if instructions from the switch controller has been received. If instruction was not received, flow proceeds to block 330 where the microcomputer analyzes the signal strength of the unit in the active call.

At block 340, the microcomputer performs a test to determine whether or not the analyzed signal strength is acceptable for continued communication. If the signal strength is adequate, flow proceeds to blocks 350 and 360 where the microcomputer checks the output of IDC 135 to determine if the threshold level (indicating excessive correlated interference) has been exceeded. If the threshold level has not been exceeded, flow proceed from block 370 where the microcomputer proceeds to execute general background tasks. Of course, the steps 310–360 would be periodically executed to maintain acceptable communication for the radiotelephone in the active call.

From either blocks 340 or 360, flow proceeds to block 380 when the integrity of the radiotelephone communication channel is detected as unacceptable (due to failure of the signal strength test or interference test, respectively). Thus, at block 380 the microcomputer informs the switch controller that the switch controller can determine an appropriate course to avoid the interference.

Such action may require the radiotelephone unit 130 or base site equipment 115 or 119 hosting the call to increase transmission power in order to improve the C/I ratio. In other instances it may be appropriate for the base site equipment to instruct the radiotelephone unit 130 to perform a handoff. For more details on the handoff procedure, reference may be made to U.S. Pat. No. 4,654,867 and 4,485,486, supra. Alternatively, the base site equipment hosting the call may be instructed to switch to a different communication channel experiencing less interference.

From block 380, while the switch controller is making such a determination, flow returns to block 310 where the unit is still in an active call. From block 310, as previously indicated, the microcomputer determines if instructions from the switch controller have been received. If instructions have been received, flow proceeds from block 320 to block 390 where the base site equipment implements the instructions.

What is claimed is:

1. A circuit for detecting and indicating interference of a received signal having a high frequency angular modulated component and a low frequency amplitude modulated fading component having a fading frequency, the circuit comprising:

a logarithmic amplifier having an input for receiving the received signal and an output for providing a logarithmic amplifier output;

means, coupled to the logarithmic amplifier, for sampling the logarithmic amplifier's output at a sampling rate based on the high frequency angular modulated component within a sampling window having a duration less than the period associated with the fading frequency of the low frequency amplitude modulated fading component; and means, in communication with said sampling means, for detecting and indicating interference of the received signal as a function of amplitude modulations detected at the logarithmic amplifier output.

2. The circuit of claim 1 wherein the sampling means is a device selected from the group consisting of:

analog-to-digital converters;

digital wave form analyzers; and spectrum analyzers.

3. The circuit of claim 1 wherein the means for detecting and indicating interference on the high frequency angular modulated signal comprises a microcomputer.

4. The circuit according to claim 3 wherein the means for detecting and indicating interference further comprises:

a programming controller for use with the microcomputer, the controller comprising:

a microcomputer program storage medium having a program to be executed by the microcomputer, stored thereon, the program comprising:

means for detecting high frequency amplitude modulations of the sampled logarithmic amplifier output;

means for distinguishing those high frequency amplitude modulations due to interference from those due to other sources; and means for determining an angular modulated signal to interference ratio.

5. The circuit according to claim 4 wherein the distinguishing means identifies those high frequency amplitude modulations due to interference as a function of the sampling means sampling period.

6. A circuit for detecting and indicating radio interference of a signal having a high frequency angular modulated component and a fading component having a fading frequency, the circuit comprising:

a logarithmic amplifier having an input for receiving the signal and an output for providing a logarithmic amplifier output;

an FM detector, coupled to the logarithmic amplifier input, for receiving the signal, detecting an associated FM modulation thereof, and providing an output in response thereto;

an analog-to-digital converter, coupled to the logarithmic amplifier and the FM detector, for sampling their outputs at a sampling rate based on the high frequency angular modulated component within a sampling window having a duration less than the period associated with the fading frequency to provide digital samples thereof; and a processor in communication with the analog-to-digital converter, for detecting and indicating interference of the signal as a function of amplitude modulations detected at the logarithmic amplifier output.

7. The circuit of claim 6 wherein the FM detector is a device selected from the group consisting of FM discriminators, and peak detectors.

8. The circuit of claim 6 wherein the processor comprises a microcomputer.

9. The circuit of claim 8 wherein the circuit further comprises:

a programming controller for use with the microcomputer, the controller comprising:

a microcomputer program storage medium having a program to be executed by the microcomputer, stored thereon, the program comprising:

means for detecting high frequency amplitude modulation of the sampled logarithmic amplifier output;

means for distinguishing those high frequency amplitude modulations due to interference from those due to other sources; and means for determining an angular modulated signal to interference ratio.

10. A circuit for detecting and indicating radio interference of a signal having a high frequency angular modulated component and a fading component having a fading frequency, the circuit comprising:

a logarithmic amplifier having an input for receiving the signal and an output for providing a logarithmic amplifier output;

an FM detector, coupled to the logarithmic amplifier input, for receiving the signal, detecting an associated FM modulation thereof, and providing an output in response thereto;

an analog-to-digital converter, coupled to the logarithmic amplifier and the FM detector, for sampling their outputs at a sampling rate based on the high frequency angular modulated component within a sampling window having a duration less than the period associated with the fading frequency to provide digital samples thereof;

a processor in communication with the analog-to-digital converter, for detecting and indicating interference of the signal as a function of amplitude modulations detected at the logarithmic amplifier output, determining an angular modulated signal to interference ratio, and aborting the angular modulated signal to interference ratio's determination when the FM detector output exceeds a predetermined threshold.

11. A communication device comprising:

a receiver circuit for receiving a signal having a high frequency angular modulated component and a fading component having a fading frequency;

an interference detection circuit, coupled to the receiver circuit, for detecting and indicating radio interference of the received signal comprising:

a logarithmic amplifier having an input responsive to the receiver circuit for receiving the signal and an output for providing a logarithmic amplifier output;

a sampling device, responsive to the logarithmic amplifier, for sampling the logarithmic amplifier's output at a sampling rate based on the high frequency angular modulated component within a sampling window having a duration less than the period associated with the fading frequency to provide digital samples thereof, and means, in communication with the sampling device, for detecting and indicating radio interference on the signal as a function of amplitude modulations detected at the logarithmic amplifier output; and means, in communication with the interference detection circuit, for reducing the radio interference.

12. The communications device of claim 11 wherein the receiver circuit comprises:

at least one IF amplifier for amplifying high frequency angular modulated communication signals to provide IF signals; and at least one IF filter, coupled to the at least one IF amplifier, for filtering the IF signals to provide filtered IF signals to the interference detection circuit.

13. The communications device of claim 11 further comprising an FM detector coupled to the logarithmic amplifier input, for receiving the high frequency angular modulated signals, detecting an associated FM modulation thereof, and providing an output in response thereto.

14. The communication device of claim 11 wherein the means for detecting and indicating interference on the communication signal comprises a microprocessor.

15. The communication device according to claim 14 wherein the microprocessor is programmed to:

detect high frequency amplitude modulation of the logarithmic amplifier's output;

isolate those high frequency amplitude modulations due to interference;

ignore those high frequency amplitude modulations due to fading;

measure the isolated high frequency amplitude modulations; and determine a communication signal to interference ratio.

16. The communication device of claim 11 wherein the interference avoiding means comprises at least one of the following:

means for increasing the communication signal's signal power to improve the communication signal to interference ratio;

means for switching a communication channel to a different channel experiencing less interference; and means for switching reception to a different antenna experiencing less interference.

17. A communication device comprising:

a receiver circuit for receiving a signal having a high frequency angular modulated component and a fading component having a fading frequency;

an interference detection circuit, coupled to the receiver circuit, for detecting and indicating radio interference of the received signal comprising:

a logarithmic amplifier having an input responsive to the receiver circuit for receiving the signal and an output for providing a logarithmic amplifier output;

a sampling device, responsive to the logarithmic amplifier, for sampling the logarithmic amplifier output for a period less than the period associated with the fading frequency to provide digital samples thereof;

means, in communication with the sampling device, for detecting and indicating radio interference in the signal as a function of amplitude modulations detected at the logarithmic amplifier output;

means, in communication with the interference detection circuit, for reducing the radio interference;

an FM detector coupled to the logarithmic amplifier input, for receiving the signal, detecting an associated FM modulation of the signal, and providing an output in response to the associated FM modulation of the signal; and a processor comparing the FM detector output to a predetermined threshold and inhibiting the means for reducing the radio interference when the FM detector output exceeds the predetermined threshold.

18. A base site for use in a wireless communication system comprising:

an antenna receiving a signal having a high frequency angular modulated component and a fading component having a fading frequency; and a circuit for detecting and indicating radio interference of the signal, the circuit comprising:

a logarithmic amplifier having an input for receiving the signal and an output for providing a logarithmic amplifier output;

an FM detector, coupled to the logarithmic amplifier input, for receiving the signal, detecting an associated FM modulation thereof, and providing an output in response thereto;

an analog-to-digital converter, coupled to the logarithmic amplifier and the FM detector, for sampling their outputs at a sampling rate based on the high frequency angular modulated component within a sampling window having a duration less than the period associated with the fading frequency to provide digital samples thereof; and a processor in communication with the analog-to-digital converter, for detecting and indicating interference of the signal as a function of amplitude modulations detected at the logarithmic amplifier output.

* * * * *